(12) United States Patent
Johannsen

(10) Patent No.: US 11,572,076 B2
(45) Date of Patent: Feb. 7, 2023

(54) TRACK WEAR DETECTION BASED ON PRESSURE DATA AND FLOW DATA

(71) Applicant: Caterpillar Inc., Peoria, IL (US)

(72) Inventor: Eric J. Johannsen, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 253 days.

(21) Appl. No.: 16/948,056

(22) Filed: Aug. 28, 2020

(65) Prior Publication Data

US 2022/0063636 A1   Mar. 3, 2022

(51) Int. Cl.
| | |
|---|---|
| *B60W 40/12* | (2012.01) |
| *E02F 9/26* | (2006.01) |
| *F16H 59/68* | (2006.01) |
| *F16H 61/12* | (2010.01) |
| *F16H 63/40* | (2006.01) |
| *G07C 3/02* | (2006.01) |

(52) U.S. Cl.
CPC .............. *B60W 40/12* (2013.01); *E02F 9/268* (2013.01); *F16H 59/68* (2013.01); *F16H 61/12* (2013.01); *F16H 63/40* (2013.01); *G07C 3/02* (2013.01); *F16H 2059/6846* (2013.01); *F16H 2059/6861* (2013.01)

(58) Field of Classification Search
CPC ........ B60W 40/12; F16H 59/68; F16H 61/12; F16H 63/40; F16H 2059/6846; F16H 2059/6861; E02F 9/268; G07L 3/02
See application file for complete search history.

(56) References Cited

U.S. PATENT DOCUMENTS

| | | | | |
|---|---|---|---|---|
| 2,452,671 | A * | 11/1948 | Merrill | B62D 55/30 305/145 |
| 3,901,563 | A | 8/1975 | Day | |
| 10,099,735 | B2 | 10/2018 | Vik et al. | |
| 2005/0029866 | A1 | 2/2005 | Tamaru et al. | |
| 2008/0224535 | A1* | 9/2008 | Schmit | B62D 55/30 701/50 |
| 2012/0002910 | A1* | 1/2012 | Snyder | F16C 17/04 29/898.041 |
| 2016/0311481 | A1 | 10/2016 | Grant et al. | |
| 2021/0173399 | A1* | 6/2021 | Richard | B60W 40/12 |

FOREIGN PATENT DOCUMENTS

| | | |
|---|---|---|
| CA | 3111529 | 3/2020 |
| WO | 2019/109191 A1 | 6/2019 |

\* cited by examiner

*Primary Examiner* — Edwin A Young
(74) *Attorney, Agent, or Firm* — Harrity & Harrity, LLP

(57) ABSTRACT

In some implementations, a controller may obtain, during an event, pressure data regarding an amount of pressure of fluid associated with a component of the machine. The controller may obtain, during the event, flow data regarding a flow of the fluid associated with the component of the machine. The controller may determine, based on the pressure data and the flow data, an amount of wear of a track of the machine. The controller may perform an action based on the amount of wear of the track of the machine.

20 Claims, 3 Drawing Sheets

TRACK WEAR DETECTION BASED ON PRESSURE DATA AND FLOW DATA

TECHNICAL FIELD

The present disclosure relates generally to monitoring track wear of a machine and, for example, to determining track wear of a machine based on pressure data and flow data.

BACKGROUND

Components (e.g., tracks) of a machine wear over a period of time. Conventional techniques for detecting wear of such components include obtaining manual measurements of component dimensions of such components. The manual measurements may be compared against specified dimensions of the components. In order to obtain the manual measurements, the machine is required to suspend performing a task at a work site. Because obtaining manual measurements is a time consuming process (e.g., the travel time for obtaining manual measurements and/or the amount of time for obtaining manual measurements), obtaining manual measurements negatively affects productivity at the work site. In this regard, the task (that is to be performed by the machine) may be suspended for a long period of time (e.g., a period of time during which the manual measurements are obtained).

Additionally, such manual measurements can be inaccurate. Inaccurate measurements of component dimensions, in turn, may result in incorrect predictions regarding a remaining life of the components. As a result of such incorrect predictions, the components may either fail prematurely or may be repaired or replaced prematurely (e.g., because the components may not be sufficiently worn to require replacement or repair). Such premature failure of the components or premature replacement or repair of the components also negatively affects productivity at the work site. Accordingly, conventional techniques for detecting wear of the components need to be improved to prevent or reduce down time at the work site (e.g., down time associated with obtaining manual measurements of component dimensions, associated with premature failure of components, associated with premature repair of components, associated with premature replacement of components, and/or the like).

U.S. Pat. No. 10,099,735 (the "'735 patent") discloses a system for monitoring the track tension for a track assembly of a work vehicle, which may include a track tensioning assembly having a fluid-driven actuator. The '735 patent discloses that the actuator may be configured to adjust the track tension of the track assembly based on a fluid pressure of fluid within the actuator. The '735 patent discloses that the system may include a controller communicatively coupled to the wireless pressure sensor. The '735 patent discloses that the controller may be configured to monitor the fluid pressure within the actuator based on wireless pressure signals received from the wireless pressure sensor, wherein the monitored fluid pressure is indicative of the track tension for the track assembly.

While the '735 patent discloses that the monitored fluid pressure is indicative of the track tension for the track assembly, the '735 patent does not disclose determining an amount of wear of the track assembly.

The controller of the present disclosure solves one or more of the problems set forth above and/or other problems in the art.

SUMMARY

In some implementations, a method performed by a controller of a machine includes obtaining, during an event, pressure data regarding an amount of pressure of fluid associated with a component of the machine; obtaining, during the event, flow data regarding a flow of the fluid associated with the component of the machine; determining, based on the pressure data and the flow data, an amount of wear of a track of the machine; and performing an action based on the amount of wear of the track of the machine.

In some implementations, a machine includes one or more memories; and one or more processors configured to: obtain at least one of: pressure data regarding an amount of pressure of fluid associated with a component of the machine, or flow data regarding a flow of the fluid associated with the component of the machine, wherein the component causes movement of one or more tracks of the machine; determine, based on the least one of the pressure data or the flow data, an amount of wear of the one or more tracks of the machine; and perform an action based on the amount of wear of the one or more tracks of the machine.

In some implementations, a system includes one or more sensors; and a controller configured to: obtain, from the one or more sensors, at least one of: pressure data regarding an amount of pressure of fluid associated with a component of a machine, or flow data regarding a flow of the fluid associated with the component of the machine, wherein the component causes movement of one or more tracks of the machine; determine, based on the least one of the pressure data or the flow data, an amount of wear of the one or more tracks of the machine; and perform an action based on the amount of wear of the one or more tracks of the machine.

DETAILED DESCRIPTION

This disclosure relates to a controller that determines an amount of wear of a track of a machine based on pressure data and/or flow data of a fluid associated with a hydrostatic drive system of the machine. The term "machine" may refer to any machine that performs an operation associated with an industry such as, for example, mining, construction, farming, transportation, or another industry. Moreover, one or more implements may be connected to the machine.

Figure 1:
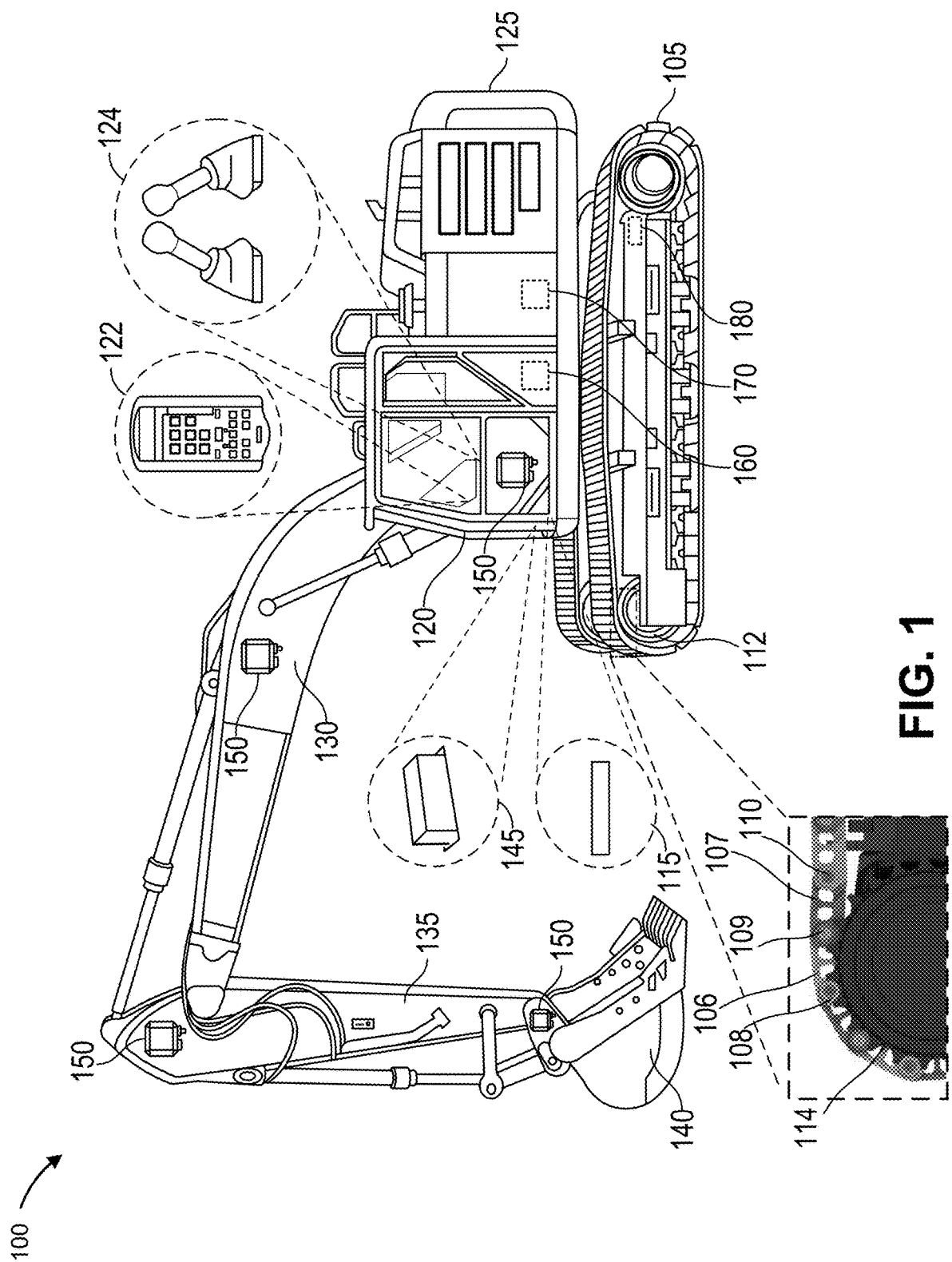
FIG. 1 is a diagram of an example machine described herein.

FIG. 1 is a diagram of an example machine 100 described herein. As shown in FIG. 1, machine 100 is embodied as an earth moving machine, such as an excavator. Alternatively, the machine 100 may be another type of track-type machine such as, for example, a dozer.

As shown in FIG. 1, machine 100 includes ground engaging members 105, a sprocket 112, a hydrostatic drive system 115, an operator cabin 120, and a machine body 125. Ground engaging members 105 may be configured to propel machine 100. In some examples, ground engaging members 105 may include tracks (as shown in FIG. 1). The tracks may include track links. A track link may include a track link bushing and a track link pin. As an example, the tracks may include a first track link 106 and a second track link 107. First track link 106 includes a first track link bushing 108 and a first track link pin 109. Second track link 107 includes a second track link pin 110. As an example, a distance between the track link pins may increase as an amount of wear of the tracks increases.

Alternatively, ground engaging members 105 may include wheels, rollers, and/or the like. Ground engaging members 105 may be mounted on a machine body (not shown) and are driven by one or more engines and drive trains (not shown). Sprocket 112 may include one or more segments 114 (referred to herein individually as "segment 114," and collectively as "segments 114"). Sprocket 112 be configured to engage with ground engaging members 105 and to drive ground engaging members 105. For example, segments 114 may be configured to engage track link bushings (e.g., of the tracks of ground engaging members 105) and rotate to cause the tracks to propel machine 100. In some instances, an amount of clearance (e.g., an amount of space) between a segment 114 and a corresponding track link bushing (e.g., when the segment 114 has engaged the corresponding track link bushing) may increase as an amount of wear of the tracks increases.

Hydrostatic drive system 115 may include a pump (e.g., a hydraulic pump), a motor (e.g., a hydraulic motor), and/or the like. Hydrostatic drive system 115 may be configured to drive ground engaging members 105 (e.g., tracks) to propel machine 100. For example, hydrostatic drive system 115 (via a fluid (e.g., hydraulic fluid)) may be configured to drive sprocket 112 to cause sprocket 112 to drive ground engaging members 105. For instance, the pump may provide the fluid (e.g., hydraulic fluid that is pressurized by the pump) to the motor to cause sprocket 112 to rotate, thereby causing ground engaging members 105 (e.g., tracks) to rotate to propel machine 100.

Operator cabin 120 includes an integrated display 122 and operator controls 124, such as, for example, integrated joystick. Operator controls 124 may include one or more input components to generate a directional shift signal to cause a directional shift of machine 100. For example, based on the directional shift signal, hydrostatic drive system 115 may cause a directional shift of machine 100. The directional shift may include a combination of a forward movement of machine 100 and a backward movement of machine 100.

For an autonomous machine, operator controls 124 may not be designed for use by an operator and, rather, may be designed to operate independently from an operator. In this case, for example, operator controls 124 may include one or more input components that provide an input signal (e.g., a directional shift signal) for use by another component (e.g., hydrostatic drive system 115) without any operator input. Operator cabin 120 is supported by machine body 125 and a rotating frame (not shown). Machine body 125 is mounted on the rotating frame.

As shown in FIG. 1, machine 100 includes a boom 130, a stick 135, and a tool 140. Boom 130 is pivotally mounted at a proximal end of machine body 125, and is articulated relative to machine body 125 by one or more fluid actuation cylinders (e.g., hydraulic or pneumatic cylinders), electric motors, and/or other electro-mechanical components. Stick 135 is pivotally mounted at a distal end of boom 130 and is articulated relative to boom 130 by the one or more fluid actuation cylinders, electric motors, and/or other electro-mechanical components. Tool 140 is mounted at a distal end of stick 135 and may be articulated relative to stick 135 by the one or more fluid actuation cylinders, electric motors, and/or other electro-mechanical components. Tool 140 may be a bucket (as shown in FIG. 1) or any other tool that may be mounted on stick 135.

As shown in FIG. 1, machine 100 includes a controller 145 (e.g., an electronic control module (ECM)), one or more inertial measurement units (IMUs) 150 (referred to herein individually as "IMU 150," and collectively referred to collectively as "IMUs 150"), a pressure sensor device 160, a flow sensor device 170, and a motion sensor device 180. Controller 145 may control and/or monitor operations of machine 100. For example, controller 145 may control and/or monitor the operations of machine 100 based on signals from operator controls 124, from IMUs 150, from pressure sensor device 160, from flow sensor device 170, from motion sensor device 180, and/or the like.

As shown in FIG. 1, IMUs 150 are installed at different positions on components or portions of machine 100, such as, for example, on machine body 125, boom 130, stick 135, and tool 140. An IMU 150 includes one or more devices that are capable of receiving, generating, storing, processing, and/or providing signals indicating a position and orientation of a component, of machine 100, on which the IMU 150 is installed. For example, the IMU 150 may include one or more accelerometers and/or one or more gyroscopes. The one or more accelerometers and/or the one or more gyroscopes generate and provide signals that can be used to determine a position and orientation of the IMU 150 relative to a frame of reference and, accordingly, a position and orientation of the component.

Pressure sensor device 160 may include one or more sensor devices that are capable of sensing a pressure of the fluid (e.g., hydraulic fluid) of hydrostatic drive system 115 and generating a signal (e.g., pressure data) indicating the pressure of the fluid. For example, the pressure may correspond to a pressure of a hydraulic fluid supplied to and/or provided by the motor (included in hydrostatic drive system 115). Pressure sensor device 160 may include a pressure sensor, a pressure transducer, and/or the like.

Flow sensor device 170 may include one or more sensor devices that are capable of sensing a flow (e.g., a flow rate) of the fluid of hydrostatic drive system 115 and generating a signal (e.g., flow data) indicating the flow (e.g., the flow rate) of the fluid. For example, the flow may correspond to a flow rate of the hydraulic fluid supplied to and/or provided by the motor (included in hydrostatic drive system 115). Flow sensor device 170 may include a flow sensor, a flow rate monitor, a pump flow rate, and/or the like.

Motion sensor device 180 may include one or more sensor devices that are capable of sensing a motion of machine 100 and generating a signal (e.g., motion data) indicating the motion of machine 100. Motion sensor device 10 may include a global positioning system (GPS) component, an accelerometer, a gyroscope, an actuator, and/or the like.

As explained in more detail below, controller 145 may detect a movement of machine 100 (e.g., a directional shift of machine 100) based on motion data obtained from motion sensor device 180. In some example, based on detecting the movement, controller 145 may obtain pressure data (from pressure sensor device 160) and/or flow data (from flow sensor device 170) during the directional shift of machine 100 and may use the pressure data and/or the flow data to determine an amount of wear of the tracks of machine 100.

In some implementations, the amount of wear of the tracks of machine may be correlated with an amount of pressure of the fluid (of hydrostatic drive system 115) and/or a flow rate of the fluid. For example, an amount of pressure of the fluid used to effectuate the directional shift of machine 100 may increase as the amount of wear of the tracks increases. Similarly, the flow rate of the fluid may decrease as the amount of wear of the tracks increases (e.g., because the flow rate of the fluid may be inversely proportional to the pressure of the fluid).

Additionally, or alternatively, the amount of wear of the tracks of machine may be correlated with an amount of time between when controller 145 detects a request for a directional shift of machine 100 (e.g., based on a directional shift signal from operator controls 124) and when controller 145 detects an increase (or a spike) in the amount of pressure of the fluid following the request for the directional shift. Such amount of time (hereinafter referred to "pressure spike time") may increase as the amount of wear of the tracks increases (e.g., due to an increased distance between the track link pins and/or an increased amount of space between segments 114 and corresponding track link bushings). Similarly, the amount of wear of the tracks of machine may be correlated with an amount of time between when controller 145 detects the request for the directional shift of machine 100 and when controller 145 detects a decrease (or a drop) in the flow rate of the fluid following the request for the directional shift. Such amount of time (hereinafter referred to "flow drop time") may increase as the amount of wear of the tracks increases.

During a directional shift of machine 100, a pressure of the hydraulic fluid may increase (during a period of time) as segments 114 engage the track link bushings (of the tracks) to rotate the tracks (e.g., from one direction to an opposite direction). In this regard, a flow rate of the hydraulic fluid may decrease (during the period of time). The pressure of the hydraulic fluid may increase and the flow rate of the hydraulic fluid may decrease due to the amount of force required to rotate the tracks (e.g., from one direction to an opposite direction).

As the tracks experience wear, a distance between the track link pins may increase (e.g., a distance between first track link 109 and second track link 110) may increase. An amount of clearance (or amount of space) between segments 114 and the track link bushings (e.g., when segments 114 have engaged the track link bushings) may increase in addition to, or as an alternative to the distance between the track link pins increasing. As a result of such increases, the pressure spike time and the flow drop time may increase. Controller 145 may determine an amount of wear of one or more of the tracks of machine 100 based on an increase in the pressure spike time and/or an increase in the flow drop time.

As indicated above, FIG. 1 is provided as an example. Other examples may differ from what was described in connection with FIG. 1.

Figure 2:
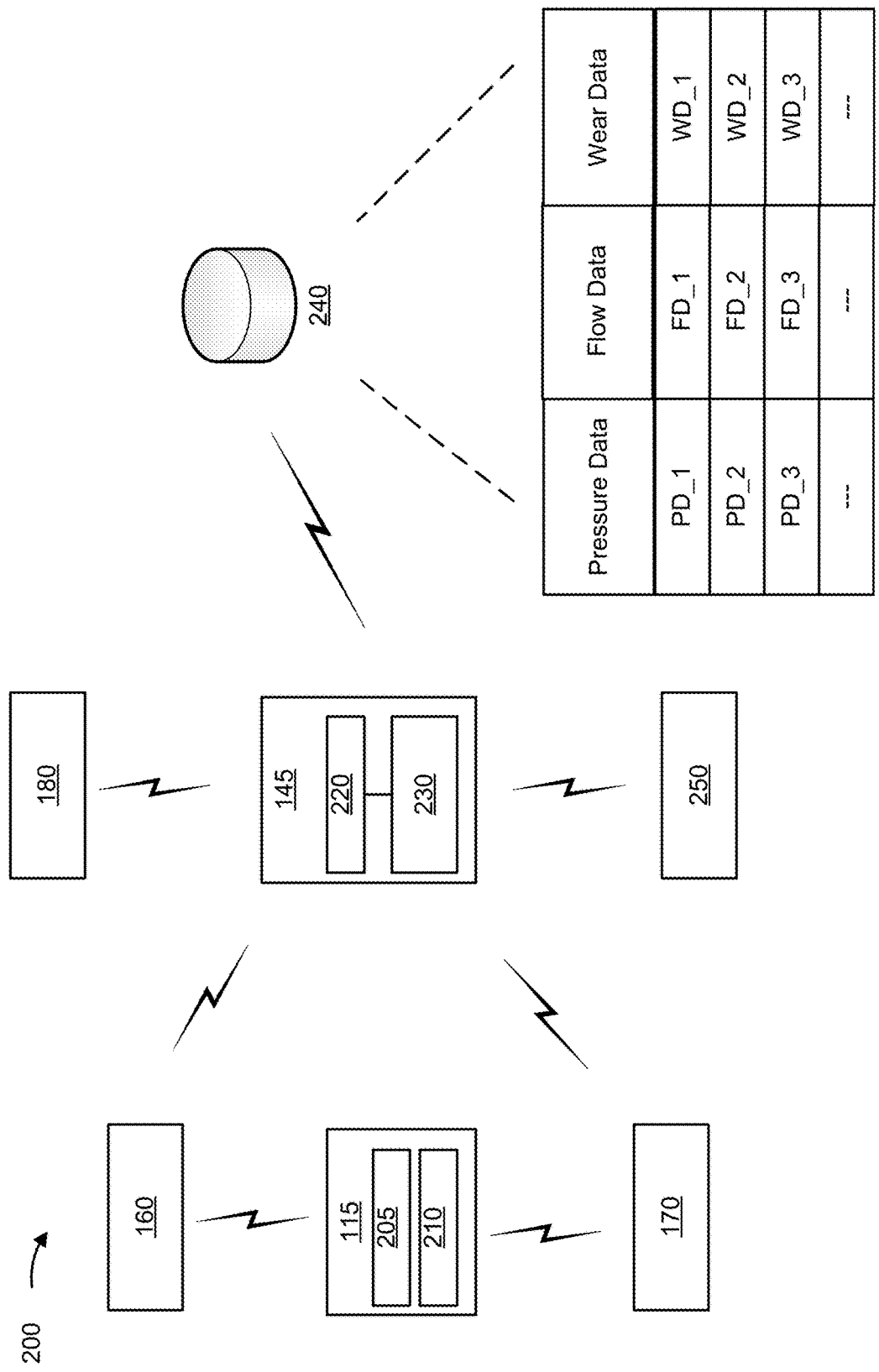
FIG. 2 is a diagram of an example system, described herein, that may be implemented in association with the machine of FIG. 1.

FIG. 2 is a diagram of an example system 200, described herein, that may be implemented in association with the machine of FIG. 1 (e.g., machine 100). As shown in FIG. 2, system 200 includes hydrostatic drive system 115, controller 145, pressure sensor device 160, flow sensor device 170, motion sensor device 180, a data storage 240, and one or more devices 250.

As shown in FIG. 2, hydrostatic drive system 115 may include a pump 205 and a motor 210 fluidly connected to pump 205. As an example, pump 205 may include a hydraulic pump. Pump 205 may be configured to pressurize a fluid (e.g., a hydraulic fluid) and provide the pressurized fluid to motor 210. As an example, motor 210 may include a hydraulic motor. Motor 210 may be configured to receive the pressurized fluid from pump 205 and use the pressurized fluid to cause sprocket 112 to rotate, thereby causing ground engaging members 105 (e.g., tracks) to rotate to propel machine 100.

Controller 145 may include one or more processors 220 (referred to herein individually as "processor 220," and collectively as "processors 220"), and one or more memories 230 (referred to herein individually as "memory 230," and collectively as "memories 230"). A processor 220 is implemented in hardware, firmware, and/or a combination of hardware and software. Processor 220 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. A processor 220 may be capable of being programmed to perform a function.

Memory 230 includes a random-access memory (RAM), a read only memory (ROM), and/or another type of dynamic or static storage device (e.g., a flash memory, a magnetic memory, and/or an optical memory) that stores information and/or instructions for use by a processor 220 to perform a function. For example, when performing a function, controller 145 (e.g., using a processor 220 and a memory 230) may obtain pressure data (e.g., data regarding a pressure of the fluid of hydrostatic drive system 115) from pressure sensor device 160 and/or flow data (e.g., data regarding a flow rate of the fluid) from flow sensor device 170. Controller 145 may determine an amount of wear of ground engaging members 105 (e.g., the tracks) based on the pressure data and/or the flow data.

Pressure sensor device 160 may be configured to transmit the pressure data to controller 145 to enable controller 145 to determine an amount of wear of ground engaging members 105 (e.g., the tracks) based on the pressure data. The pressure data may include information identifying an amount of pressure of the fluid of hydrostatic drive system 115 (e.g., during a directional shift of machine 100).

Pressure sensor device 160 may be configured to transmit the pressure data to controller 145 periodically (e.g., every work shift, every day, every week, every month, upon occurrence of a trigger, and/or the like). In some examples, pressure sensor device 160 may be preconfigured with a period of time for transmitting the pressure data. Alternatively, the period of time for transmitting the pressure data may be determined by an operator associated with machine 100. Alternatively, the period of time for transmitting the pressure data may be determined by controller 145 (e.g., based on historical pressure transmission data regarding machine 100).

The historical pressure transmission data may include historical data regarding periods of time for transmitting the pressure data, frequency of movements of machine 100 (e.g., frequency of directional shifts), frequency of repair and/or replacement of ground engaging members 105 (e.g., the tracks), and/or the like. In some examples, pressure sensor device 160 may be configured to transmit the pressure data to controller 145 based on requests from controller 145. For instance, controller 145 may transmit a request for the pressure data based on detecting a request for a directional shift of machine 100, based detecting a movement (of machine 100) corresponding to the directional shift, and/or the like.

Flow sensor device 170 may be configured to transmit the flow data to controller 145 to enable controller 145 to determine an amount of wear of ground engaging members 105 (e.g., the tracks) based on the flow data. The flow data may include information identifying a flow rate of the fluid (of hydrostatic drive system 115) (e.g., during a directional shift of machine 100).

Flow sensor device 170 may be configured to transmit the flow data to controller 145 periodically (e.g., every work shift, every day, every week, every month, upon occurrence of a trigger, and/or the like). In some examples, flow sensor device 170 may be preconfigured with a period of time for transmitting the flow data. Alternatively, the period of time for transmitting the flow data may be determined by the operator associated with machine 100. Alternatively, the period of time for transmitting the flow data may be determined by controller 145 (e.g., based on historical flow transmission data regarding machine 100).

The historical flow transmission data may include historical data regarding periods of time for transmitting the flow data, frequency of movements of machine 100 (e.g., frequency of directional shifts), frequency of repair and/or replacement of ground engaging members 105 (e.g., the tracks), and/or the like. In some examples, pressure sensor device 160 may be configured to transmit the flow data to controller 145 based on requests from controller 145. For instance, controller 145 may transmit a request for the flow data based on detecting a request for a directional shift of machine 100, based detecting a movement (of machine 100) corresponding to the directional shift, and/or the like.

Motion sensor device 180 may be configured to transmit motion data to controller 145 to enable controller 145 to determine a movement of machine 100 based on the motion data. The motion data may include information identifying a movement of machine 100. For example, the motion data may indicate that machine 100 is in motion (e.g., machine 100 is performing a directional shift).

Motion sensor device 180 may be configured to transmit the motion data to controller 145 periodically (e.g., every second, every minute, upon occurrence of a trigger, and/or the like). In some examples, motion sensor device 180 may be preconfigured with a period of time for transmitting the motion data. Alternatively, the period of time for transmitting the motion data may be determined by the operator associated with machine 100.

Alternatively, the period of time for transmitting the motion data may be determined by controller 145 (e.g., based on historical motion transmission data regarding machine 100). The historical motion transmission data may include historical data regarding periods of time for transmitting the motion data, frequency of movements of machine 100 (e.g., frequency of directional shifts), and/or the like.

Data storage 240 may include a device that stores a data structure (e.g., a database, a linked list, a table, and/or the like). The data structure may store information identifying different pressure data and/or flow data of machine 100 in association with wear data. The pressure data may include information regarding the pressure of the fluid associated with hydrostatic drive system 115. For example, the pressure data may include information identifying an amount of pressure of the fluid (of hydrostatic drive system 115), information identifying a range of amounts of pressure of the fluid (of hydrostatic drive system 115), information identifying a pressure spike time, and/or the like (e.g., associated with a directional shift of machine 100).

The flow data may include information regarding a flow rate of the fluid associated with hydrostatic drive system 115. For example, the flow data may include information identifying a flow rate of the fluid (of hydrostatic drive system 115), information identifying a range of flow rates of the fluid (of hydrostatic drive system 115), information identifying a flow drop time, and/or the like (e.g., associated with a directional shift of machine 100).

The wear data may include information regarding an amount of wear of ground engaging members 105 (e.g., the tracks). For example, the information regarding the amount of wear may include ratios, absolute values, other mathematical functions or operations, and/or the like identifying the amount of wear of the tracks. Additionally, the information regarding the amount of wear may include measurements associated with ground engaging members 105 such as, for example, information identifying a distance between the track link pins, information identifying an amount clearance between a segment 114 and a corresponding track link bushing, information identifying other measurements associated with the tracks, and/or the like.

As an example, in the data structure, first pressure data and/or first flow data may be stored in association with first wear data, second pressure data and/or second flow data may be stored in association with second wear data, and so on. In other words, the first pressure data may identify a first amount of pressure of the fluid (of hydrostatic drive system 115), a first range of amounts of pressure of the fluid, a first pressure spike time, and/or the like corresponding to a first amount of wear of the tracks identified by the first wear data.

Similarly, the first flow data may identify a first flow rate of the fluid (of hydrostatic drive system 115), a first range of flow rates of the fluid, a first flow drop time, and/or the like corresponding to the first amount of wear of the tracks identified by the first wear data, and so on. As an example, controller 145 may obtain pressure data and/or flow data and may use the obtained pressure data and/or the obtained flow data to identify, in the data structure, wear data associated with the obtained pressure data and/or the obtained flow data.

The information stored in the data structure may be provided by controller 145 and/or by a device associated the operator of machine 100. For example, controller 145 may cause a directional shift of machine 100. For instance, controller 145 may prompt the operator to cause the directional shift of machine 100. Alternatively, controller 145 may cause the directional shift of machine 100 without intervention of the operator (e.g., via an unmanned mode of operation). Controller 145 may obtain pressure data (from pressure sensor device 160) and flow data (from flow sensor device 170) during the directional shift of machine 100.

Controller 145 may prompt the operator to obtain wear data of the tracks of machine 100. For instance, controller 145 may prompt the operator to obtain manual measurements of the tracks indicating the amount of wear of the tracks. The operator may obtain the manual measurements and may provide (e.g. using a device associated with the operator) such manual measurements to data storage 240 for storage in the data structure or provide (e.g., using the device) such manual measurements to controller 145. For example, the operator may use a measuring device (e.g., the device associated with the operator) to obtain manual measurements of the tracks. Alternatively, the operator may capture (e.g., using the measurement device) an image of the tracks and provide the image to controller 145. Controller 145 (or another device external with respect to machine 100) may analyze the image (e.g., using one or more image processing technique) to determine the wear of the tracks. The one or more image processing techniques may include a computer vision technique, an optical character recognition (OCR) technique, and/or the like. The device may include a user device (e.g., a mobile device, a laptop, and/or the like), integrated display 122, and/or the like. Controller 145 may provide the wear data, the pressure data, and/or the flow data to data storage 240 for storage in the data structure.

In some instances, the wear data, the pressure data, and/or the flow data may be used to generate graphical representation (e.g., a graph) of the pressure spike time, the flow drop time, and/or the like. Such graphical representation may be provided to the device associated with the operator, to one or more devices that monitor an amount of wear of components of a plurality of machines, and/or the like.

Additionally, or alternatively, the information stored in the data structure may be provided by controller 145 based on a simulation model that simulate operations of machine 100. For example, controller 145 may use the simulation model to simulate a movement of machine 100 (e.g., a directional shift of machine 100) and to obtain pressure data and/or flow data during the simulated movement. Controller 145 may use the simulation model to obtain wear data of machine 100 associated with the movement of machine 100. Controller 145 may provide the wear data, the pressure data, and/or the flow data (obtained using the simulation model) to data storage 240 for storage in the data structure.

Devices 250 (referred to herein individually as "device 250," and collectively as "devices 250") may include one or more devices that may monitor an amount of wear of components of a plurality of machines (e.g., including machine 100). Devices 250 may include a server device (e.g., a host server, a web server, an application server, and/or the like), a computer (e.g., a laptop, a desktop, and/or the like), a user device (e.g., a mobile device, a laptop, and/or the like), a cloud device, and/or the like.

Controller 145 may obtain data from pressure sensor device 160, flow sensor device 170, motion sensor device 180, and/or data storage 240 to determine an amount of wear of ground engaging members 105 (e.g., the tracks), as described in more detail below. In some examples, controller 145 may detect an event. For example, controller 145 may obtain motion data from motion sensor device 180 and may detect, based on the motion data, a movement of machine 100 as the event. The movement of machine 100 may include a directional shift of machine 100 (e.g., a direction shift caused by hydrostatic drive system 115). Additionally, or alternatively, controller 145 may detect a directional shift signal (generated by operator controls 124) as the event.

Controller 145 may obtain pressure data from pressure sensor device 160 (e.g., based on detecting the event). Controller 145 may obtain the pressure data from pressure sensor device 160 in a manner similar to the manner described above. As an example, during the event, controller 145 may obtain (from pressure sensor device 160) pressure data regarding an amount of pressure of fluid associated with a component of machine 100. The component may include hydrostatic drive system 115, components of hydrostatic drive system 115, and/or the like. As an example, the fluid may include hydraulic fluid of hydrostatic drive system 115 and the amount of pressure may correspond to an amount of pressure of the hydraulic fluid (e.g., supplied to and/or provided by motor 210 to cause the directional shift). In some instances, based on the obtained pressure data, controller 145 may determine a pressure spike time associated with the directional shift.

Additionally, or alternatively, controller 145 may obtain flow data from flow sensor device 170 (e.g., based on detecting the event). Controller 145 may obtain the flow data from flow sensor device 170 in a manner similar to the manner described above. As an example, during the event, controller 145 may obtain (from flow sensor device 170) flow data regarding a flow of the fluid associated with the component of machine 100. For example, the flow of the fluid may correspond to a flow rate of the hydraulic fluid supplied to and/or provided by motor 210 to cause the directional shift. In some instances, based on the obtained flow data, controller 145 may determine a flow drop time associated with the directional shift.

Controller 145 may determine an amount of wear of ground engaging members 105 based on the pressure data and/or the flow data. For example, controller 145 may determine an amount of wear of a track of machine 100 based on the pressure data and/or the flow data. As an example, controller 145 may use the obtained pressure data and/or the obtained flow data to obtain, from the data structure of data storage 240, wear data associated with the obtained pressure data and/or the obtained flow data.

For example, controller 145 may search the data structure to identify pressure data corresponding to the obtained pressure data. For instance, controller 145 may search the data structure to identify pressure data that includes information identifying an amount of pressure of the fluid that corresponds to an amount of pressure identified by the obtained pressure data, information identifying a range of amounts of pressure of the fluid that corresponds to a range of amounts of pressure identified by the obtained pressure data, information identifying a pressure spike time that corresponds to the pressure spike time determined using the obtained pressure data, and/or the like.

Additionally, or alternatively, controller 145 may search the data structure to identify flow data corresponding to the obtained flow data. For instance, controller 145 may search the data structure to identify flow data that includes information identifying a flow rate of the fluid that corresponds to a flow rate identified by the obtained pressure data, information identifying a range of flow rates of the fluid that corresponds to a range of flow rates identified by the obtained flow data, information identifying a flow drop time that corresponds to the flow drop time determined using the obtained flow data, and/or the like.

Controller 145 may identify the wear data associated with the identified pressure data and/or the identified flow data. The identified wear data may identify an amount of wear of ground engaging members 105 (e.g., an amount of wear of the tracks of machine 100). By way of example, assume controller 145 identifies the pressure data as having a value of PD_2 and the flow data as having a value of FD_2. Controller 145 would then determine, from data storage 240, a value of WD_2 for the wear data. Accordingly, controller 145 may determine the amount of wear of ground engaging members 105 based on the obtained pressure data and/or the obtained flow data.

Additionally or alternatively to using the data structure of data storage 240, controller 145 may use a machine learning model to determine the amount of wear of ground engaging members 105 (e.g., the tracks). For example, controller 145 may input, into the machine learning model, the obtained pressure data and/or he obtained flow data and the machine learning model may output information identifying the amount of wear of ground engaging members 105.

Controller 145 may train the machine learning model using historical data associated with machine 100, associated with one or more other machines similar to machine 100, and/or the like. The one or more machines may include similar components (e.g., similar ground engaging members 105, similar sprocket 112, similar hydrostatic drive system 115, and/or the like), similar dimensions, similar usage, and/or the like as machine 100. The historical data may include historical pressure data (including historical pressure spike data), historical flow data (including historical flow drop data), historical wear data, and/or the like.

When training the machine learning model, controller 145 may portion the historical data into a training set (e.g., a set of data to train the model), a validation set (e.g., a set of data used to evaluate a fit of the model and/or to fine tune the model), a test set (e.g., a set of data used to evaluate a final fit of the model), and/or the like. Controller 145 may preprocess and/or perform dimensionality reduction to reduce the historical data to a minimum feature set. Controller 145 may train the model on this minimum feature set, thereby reducing processing to train the machine learning model, and may apply a classification technique, to the minimum feature set.

Controller 145 may use a classification technique, such as a logistic regression classification technique, a random forest classification technique, a gradient boosting machine learning (GBM) technique, and/or the like, to determine a categorical outcome (e.g., an amount of wear of ground engaging members 105). In addition to, or as an alternative to use the classification technique, controller 145 may use a naïve Bayesian classifier technique. In this case, controller 145 may perform binary recursive partitioning to split the historical data of the minimum feature set into partitions and/or branches and use the partitions and/or branches to perform predictions (e.g., an amount of wear of ground engaging members 105). Based on using recursive partitioning, controller 145 may reduce utilization of computing resources relative to manual, linear sorting and analysis of data items, thereby enabling use of thousands, millions, or billions of data items to train a model, which may result in a more accurate model than using fewer data items.

Controller 145 may train the model using a supervised training procedure that includes receiving input to the model from a subject matter expert (e.g., one or more operators associated with machine 100 and/or the one or more machines), which may reduce an amount of time, an amount of processing resources, and/or the like to train the model relative to an unsupervised training procedure. Controller 145 may use one or more other model training techniques, such as a neural network technique, a latent semantic indexing technique, and/or the like.

For example, controller 145 may perform an artificial neural network processing technique (e.g., using a two-layer feedforward neural network architecture, a three-layer feedforward neural network architecture, and/or the like) to perform pattern recognition with regard to patterns of different amounts of wear of ground engaging members 105 (e.g., the tracks). In this case, using the artificial neural network processing technique may improve an accuracy of the model generated by controller 145 by being more robust to noisy, imprecise, or incomplete data, and by enabling controller 145 to detect patterns and/or trends undetectable to human analysts or systems using less complex techniques.

After training, the machine learning model may be used to determine (or predict) an amount of wear of ground engaging members 105 (e.g., the tracks). In other words, controller 145 may input, into the machine learning model, the obtained pressure data and/or he obtained flow data and the machine learning model may output data relating to an amount of wear of ground engaging members 105. The output of the model may include a score for the amount of wear of ground engaging members 105.

The score, for the amount of wear of ground engaging members 105, may represent a measure of confidence of the amount of wear determined by the machine learning model. In this regard, controller 145 may use the amount of wear predicted by the machine learning model when the measure of confidence of the amount of wear satisfies a threshold measure of confidence. In some instances, controller 145 may use the amount of wear predicted by the machine learning model if controller 145 is unable to identify, in the data structure, wear data associated the obtained pressure data and/or the obtained flow data.

A different device, such as a server device, may generate and train the machine learning model. The different device may provide the machine learning model for use by controller 145. The different device may update and provide (e.g., on a scheduled basis, on an on-demand basis, on a triggered basis, on a periodic basis, and/or the like) the machine learning model to controller 145. Controller 145 may update the machine learning model.

Controller 145 may perform an action based on the amount of wear of ground engaging members 105 (e.g., the tracks of machine 100). For example, the action may include controller 145 controlling a movement of machine 100 based on the amount of wear. For instance, controller 145 may prevent movement of machine 100 when the amount of wear satisfies a threshold amount of wear.

The action may include controller 145 transmitting track wear information to one or more devices that monitor an amount of wear of components of a plurality of machines (e.g., including machine 100). The track wear information may indicate the amount of wear of ground engaging members 105 (e.g., the tracks of machine 100), indicate an amount of life remaining for ground engaging members 105 (e.g., the tracks of machine 100), an offer associated with repairing and/or replacing ground engaging members 105 (e.g., the tracks of machine 100). In some instances, the track wear information may cause the one or more devices to generate a service request to repair and/or replace ground engaging members 105. For example, the service request may be generated when the amount of wear satisfies the threshold amount of wear.

The action may include controller 145 transmitting the track wear information to a device associated with the operator of machine 100. In some instances, the track wear information may cause the operator to submit (e.g., using the device) a service request to repair and/or replace ground engaging members 105 in a manner similar to the manner described above. The action may include controller 145 transmitting the track wear information to a device associated with a technician. For example, the track wear information may cause the technician to be dispatched to machine 100. In some instances, the technician may be dispatched when the amount of wear satisfies the threshold amount of wear.

The action may include controller 145 causing an autonomous device to deliver a replacement track to machine 100 or to a location associated with machine 100 (e.g., when the amount of wear satisfies the threshold amount of wear). The location may include a work site where machine 100 performs multiple task, a location where machine 100 is stationed when machine 100 is not performing a task, a location where machine 100 is stationed when machine 100 is undergoing repair and/or replacement.

The action may include controller 145 causing replacement ground engaging members (e.g., a replacement track) to be ordered for machine 100. For instance, the replacement ground engaging members 105 may be ordered when the amount of wear of ground engaging members 105 satisfies the threshold amount of wear.

The action may include controller 145 automatically providing, to machine 100, an instruction that causes machine 100 to autonomously drive itself to a repair facility (e.g., when the amount of wear satisfies the threshold amount of wear). In some instances, controller 145 may predict when ground engaging members 105 will fail based on the amount of wear. In such instance, controller 145 may determine a particular time to replace ground engaging members 105 based on when ground engaging members 105 are predicted to fail. If controller 145 predicts that the failure is not to occur for a long time period of time, controller 145 may not perform an action. If controller 145 predicts that the failure is imminent, controller 145 may perform one or more of the actions described above.

While the foregoing has been described with respect to obtaining pressure data and flow data associated with motor 210, the present disclosure may be applicable to obtaining pressure data and flow data associated other components of hydrostatic drive system 115.

While the foregoing has been described with respect to obtaining pressure data and/or flow data associated with a directional shift of machine 100, the present disclosure may be applicable to obtaining pressure data and/or flow data associated with other types of movements of machine 100.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of system 200 may perform one or more functions described as being performed by another set of devices of system 200.

Figure 3:
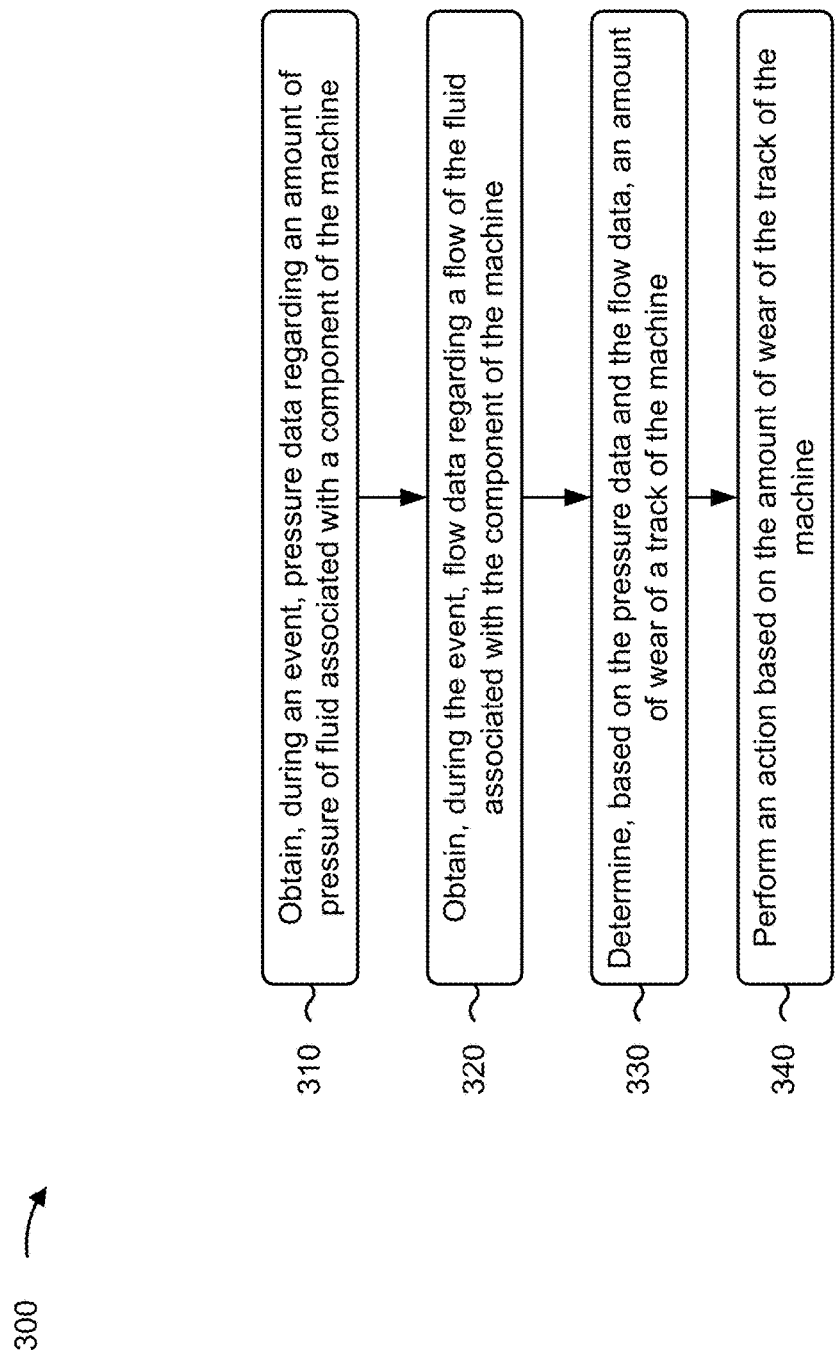
FIG. 3 is a flow chart of an example process relating to determining track wear of a machine based on pressure data and flow data.

FIG. 3 is a flowchart of an example process 300 associated with track wear detection based on pressure data and flow data. In some implementations, one or more process blocks of FIG. 3 may be performed by a controller (e.g., controller 145). In some implementations, one or more process blocks of FIG. 3 may be performed by another device or a group of devices separate from or including the controller, such as a pressure sensor device (e.g., pressure sensor device 160) and/or flow a sensor device (e.g., sensor device 160). Additionally, or alternatively, one or more process blocks of FIG. 3 may be performed by one or more components of controller 145, such as processor 220 and/or memory 230.

As shown in FIG. 3, process 300 may include obtaining, during an event, pressure data regarding an amount of pressure of fluid associated with a component of the machine (block 310). For example, the controller may obtain, during an event, pressure data regarding an amount of pressure of fluid associated with a component of the machine, as described above. In some implementations, process 300 includes detecting the event, wherein detecting the event comprises detecting a directional shift associated with a hydrostatic drive of the machine.

As further shown in FIG. 3, process 300 may include obtaining, during the event, flow data regarding a flow of the fluid associated with the component of the machine (block 320). For example, the controller may obtain, during the event, flow data regarding a flow of the fluid associated with the component of the machine, as described above.

As further shown in FIG. 3, process 300 may include determining, based on the pressure data and the flow data, an amount of wear of a track of the machine (block 330). For example, the controller may determine, based on the pressure data and the flow data, an amount of wear of a track of the machine, as described above.

In some instances, determining the amount of wear of the track of the machine includes detecting, based on the pressure data, a delay in increase of the pressure of the fluid after the event, and determining, based on the delay in increase of the pressure of the fluid, the amount of wear of the track of the machine.

As further shown in FIG. 3, process 300 may include performing an action based on the amount of wear of the track of the machine (block 340). For example, the controller may perform an action based on the amount of wear of the track of the machine, as described above.

In some examples, performing the action comprises at least one of controlling a movement of the machine based on the amount of wear of the track of the machine, transmitting track wear information to one or more devices that monitor an amount of wear of components of a plurality of machines, wherein the track wear information indicates the amount of wear of the track of the machine, or transmitting the track wear information to an operator of the machine.

In some examples, transmitting the track wear information to the one or more devices comprises transmitting the track wear information to the one or more devices to cause the one or more devices to generate, based on the amount of wear of the track, a service request to at least one of repair or replace the track.

The component may include a motor that causes movement of the track, wherein the pressure data includes data identifying an amount of pressure of fluid associated with the motor, and wherein the flow data includes data identifying a flow rate of the fluid associated with the motor.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

This disclosure relates to a process for determining track wear of a machine based on pressure data and/or flow data of a fluid associated with a hydrostatic drive system of the machine. The disclosed process for determining track wear may prevent issues associated with manual measurements of tracks of the machine (to determine an amount of wear of the tracks). Manual measurements of tracks may waste machine resources that are used to prevent movement of the machine while the manual measurements are obtained, may waste computing resources that are used to remedy issues associated with the manual measurements being inaccurate (e.g., premature failure of the tracks, premature repair of the tracks, premature replacement of the tracks, and/or the like), and/or the like.

The disclosed process for determining track wear of a machine based on pressure data and/or flow data may resolve the issues mentioned above with respect to manual measurements to determine an amount of the tracks. Several advantages may be associated with the disclosed process for determining track wear of a machine based on pressure data and/or flow data. For example, by determining track wear of a machine based on pressure data and/or flow data, the process may prevent manual measurements of the tracks which may be inaccurate.

By preventing such manual measurements, the process may prevent (or limit) any disruption in the operation of the machine. By preventing such manual measurements, the process may preserve computing or machine resources that would have otherwise been used to prevent movement of the machine while the manual measurements are obtained, to remedy issues associated with the manual measurements being inaccurate (e.g., premature failure of the tracks, premature repair of the tracks, premature replacement of the tracks, and/or the like), and/or the like.

The foregoing disclosure provides illustration and description, but is not intended to be exhaustive or to limit the implementations to the precise form disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A method performed by a controller of a machine, the method comprising:
obtaining, during an event, pressure data regarding an amount of pressure of fluid associated with a component of the machine;
obtaining, during the event, flow data regarding a flow of the fluid associated with the component of the machine;
determining, based on the pressure data and the flow data, an amount of wear of a track of the machine; and
performing an action based on the amount of wear of the track of the machine.

2. The method of claim 1, wherein performing the action comprises at least one of:
controlling a movement of the machine based on the amount of wear of the track of the machine;
transmitting track wear information to one or more devices that monitor an amount of wear of components of a plurality of machines, wherein the track wear information indicates the amount of wear of the track of the machine; or
transmitting the track wear information to an operator of the machine.

3. The method of claim 2, wherein transmitting the track wear information to the one or more devices comprises:
transmitting the track wear information to the one or more devices to cause the one or more devices to generate, based on the amount of wear of the track, a service request to at least one of repair or replace the track.

4. The method of claim 1, further comprising detecting the event,
wherein detecting the event comprises:
detecting a directional shift associated with a hydrostatic drive of the machine.

5. The method of claim 4, wherein detecting the directional shift comprises:
detecting a combination of a forward movement of the machine and a backward movement of the machine.

6. The method of claim 1, wherein the component includes a motor that causes movement of the track,
wherein the pressure data includes data identifying an amount of pressure of fluid associated with the motor, and
wherein the flow data includes data identifying a flow rate of the fluid associated with the motor.

7. The method of claim 1, wherein determining the amount of wear of the track of the machine includes:
detecting, based on the pressure data, a delay in increase of the pressure of the fluid during the event; and
determining, based on the delay in increase of the pressure of the fluid, the amount of wear of the track of the machine.

8. A machine, comprising:
one or more memories; and
one or more processors configured to:
obtain at least one of:
pressure data regarding an amount of pressure of fluid associated with a component of the machine, or
flow data regarding a flow of the fluid associated with the component of the machine, wherein the component causes movement of one or more tracks of the machine;
determine, based on the at least one of the pressure data or the flow data, an amount of wear of the one or more tracks of the machine; and
perform an action based on the amount of wear of the one or more tracks of the machine.

9. The machine of claim 8, wherein the one or more processors are further configured to:
obtain historical data that includes historical pressure data associated with the component, historical flow data associated with the component, and historical wear information associated with the one or more tracks;
wherein the historical wear information is associated with the historical pressure data and the historical flow data; and
wherein, when determining the amount of wear of the one or more tracks of the machine, the one or more processors are further configured to:
determine the amount of wear of the one or more tracks of the machine based on the at least one of the pressure data or the flow data and based on the historical data.

10. The machine of claim 8, wherein the one or more processors are further configured to:
detect an event associated with an operation of the machine; and
wherein, when obtaining the at least one of the pressure data or the flow data, the one or more processors are further configured to obtain the at least one of the pressure data or the flow data during the event.

11. The machine of claim 10, wherein, when detecting the event, the one or more processors are further configured to: detect a movement of the machine.

12. The machine of claim 8, wherein, when determining the amount of wear of the one or more tracks of the machine, the one or more processors are further configured to at least one of:
detect, based on the pressure data, a delay in increase of the pressure of the fluid during an event associated with a movement of the machine, or
detect, based on the flow data, a delay in decrease of the flow of the fluid during the event; and
determine the amount of wear of the one or more tracks of the machine based on the at least one of:
the delay in increase of the pressure of the fluid, or
the delay in decrease of the flow of the fluid.

13. The machine of claim 8, wherein, when performing the action, the one or more processors are further configured to at least one of:
control a movement of the machine when the amount of wear of the one or more tracks of the machine satisfies a threshold amount of wear;
transmit track wear information to one or more devices that monitor an amount of wear of components of a plurality of machines,
wherein the track wear information indicates the amount of wear of the one or more tracks of the machine; or
transmit the track wear information to an operator of the machine.

14. The machine of claim 13, wherein, when transmitting the track wear information to the one or more devices, the one or more processors are further configured to:
transmit the track wear information to the one or more devices to cause the one or more devices to generate, when the amount of wear of the one or more tracks satisfies the threshold amount of wear, a service request to at least one of repair or replace the one or more tracks.

15. A system, comprising:
one or more sensors; and
a controller configured to:
obtain, from the one or more sensors, at least one of:
pressure data regarding an amount of pressure of fluid associated with a component of a machine, or
flow data regarding a flow of the fluid associated with the component of the machine, wherein the component causes movement of one or more tracks of the machine;
determine, based on the at least one of the pressure data or the flow data, an amount of wear of the one or more tracks of the machine; and
perform an action based on the amount of wear of the one or more tracks of the machine.

16. The system of claim 15, wherein, when performing the action, the controller is configured to:
transmit track wear information to cause a service request, for the one or more tracks, to be generated when the amount of wear of the one or more tracks satisfies a threshold amount of wear,
wherein the service request is to at least one of repair or replace the one or more tracks, and
wherein the track wear information indicates the amount of wear of the one or more tracks of the machine.

17. The system of claim 15, wherein the component includes a motor that causes movement of the one or more tracks; and
wherein the motor is associated with a hydrostatic drive system of the machine.

18. The system of claim 17, wherein the pressure data includes data identifying an amount of pressure of fluid associated with the motor; and
wherein the flow data includes data identifying a flow rate of the fluid associated with the motor.

19. The system of claim 15, wherein the controller is configured to:
detect a movement of the machine; and
wherein, when obtaining the at least one of the pressure data or the flow data, the controller is to obtain the at least one of the pressure data or the flow data based on detecting the movement of the machine.

20. The system of claim 15, wherein, when determining the amount of wear of the one or more tracks of the machine, the controller is configured to:
detect, based on the pressure data, a delay in increase of the pressure of the fluid; and
determine, based on the delay in increase of the pressure of the fluid, the amount of wear of the one or more tracks of the machine.

* * * * *